Feb. 26, 1924.
J. R. SMITH
SEATLESS VALVE
Filed April 17, 1922
1,484,798
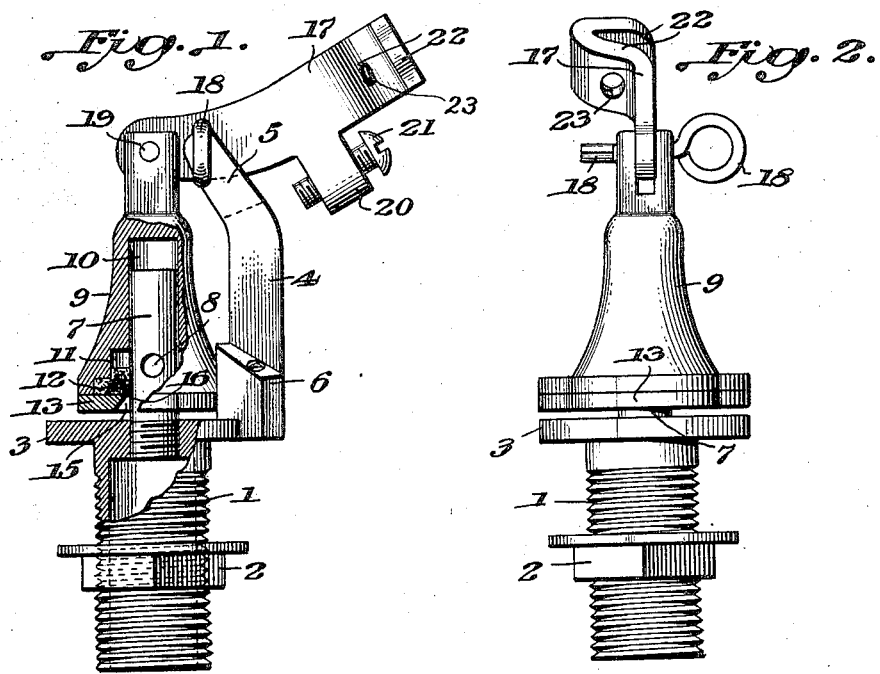
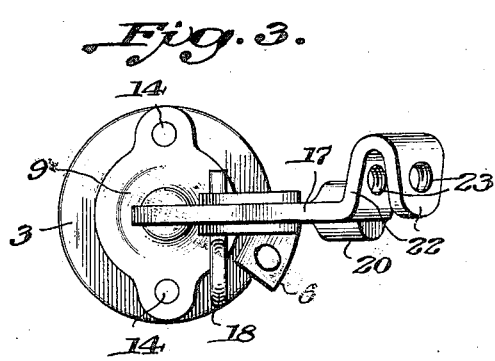

Patented Feb. 26, 1924.

1,484,798

UNITED STATES PATENT OFFICE.

JAMES ROBERT SMITH, OF MECHANICSVILLE, NEW YORK.

SEATLESS VALVE.

Application filed April 17, 1922. Serial No. 553,901.

*To all whom it may concern:*

Be it known that I, JAMES R. SMITH, a citizen of the United States, residing at Mechanicsville, in the county of Saratoga and State of New York, have invented certain new and useful Improvements in Seatless Valves, of which the following is a specification.

This invention relates to a seatless valve adapted for the control of either liquids or gases.

While the invention may be embodied in a valve used for any purpose, it is particularly useful as a flush tank valve and is hereinafter described, and shown in the accompanying drawings, in that form.

My object is to entirely eliminate the ordinary valve seat and to provide a valve, packed in an improved manner, having a novel arrangement of telescoping valve and outlet member, means for predetermining the movement of the valve so that any desired volume of flow of the liquid or gas may be determined on opening the valve and, further, to provide means by which the valve may be quickly and easily taken apart to enable repairs to be made when necessary.

A further object of the invention is to provide a seatless valve of few parts and of simple and inexpensive construction, possessing durability and adaptability to withstand long use before requiring repairs and one in which the connection or assembly of the parts can be readily effected.

I am aware that the invention can be modified without departing from its essential characteristics and, further, that it may be carried out in other forms of valve, and valves adapted for other uses than the particular valve hereinafter described and which is shown in the accompanying drawings. The disclosure of the invention is, therefore, to be considered as illustrative, instead of restrictive, of the invention.

In the accompanying drawings:

Figure 1 is a side elevation, with parts of the bell shaped valve and coupling in section, the valve being closed.

Fig. 2 is a front elevation, the valve being closed.

Fig. 3 is a plan view; and

Fig. 4 is a detail cross section through the nipple.

The screw threaded pipe coupling for the valve appears at 1, being provided with the usual nut 2 for clamping it in position. The coupling 1 is adapted to be connected to the usual supply pipe. The coupling has a head 3 cast integral with an arm 4 which is bifurcated at its upper end 5. The arm also has a shoulder 6 through which extends a screw threaded hole, the outer end of which only is shown, said hole being adapted to receive an after fill tube if such tube is desired; this is not material to my invention.

Screwed into the upper end of the coupling 1 is a nipple 7 which is a section of small size tube having laterally disposed ports 8, communicating with the hollow interior of the nipple and affording means for discharging the gas or fluid when they are uncovered, proportional to the extent they are opened.

Telescoping over the nipple 7 is a bell shaped valve 9 which has a bore 10 which snugly, yet easily, receives the nipple 7 and which is provided with a seat 11 and contains a washer or packing 12 of any suitable material, preferably leather, the washer 12 being held against the seat 11 by a detachable head 13 which is connected by screws 14 to the valve 9.

The packing or washer 12 fits snugly against the nipple 7 and effectually seals the discharge ports 8 when the valve 9 is in its lower position.

At the point where the head 13 surrounds the nipple 7, it is provided with a flared opening 15, the purpose of which is to permit free discharge of the liquid when the valve 9 is raised sufficiently far to uncover the ports 8 and to enable the discharge to commence immediately when the upper knife edge 16 surrounding this discharge port 15 commences to uncover the lower parts of the ports 8.

A lever 17 is received in the bifurcated end 5 of the arm 4 and pivoted to said arm on a split eyepin 18 which passes through the bifurcated end 5.

The upper end of the bell shaped valve 9 is split or bifurcated and receives the end of the lever 17, being riveted thereto at 19.

The lever 17 is provided with an integral piece 20 having an eye which is internally screw threaded and holds an adjusting screw 21. The screw 21 is adapted to engage the arm 4 to limit the downward movement of the lever 17 and the elevation of the bell shaped valve 9. By setting the screw 21, any desired extent of uncovering of the ports 8 may be accomplished on the full downward movement of the lever 17. This screw enables the movement to be pre-adjusted so that the valve 9 will move any desired distance between the opening and closing points to allow any part of the, or the full, area of the discharge ports 8 to be uncovered and enables a "fine" adjustment or setting to be obtained.

The end of the lever 17 is bent to form two ears 22 which are internally screw threaded at 23 for the attachment of the rod of the float commonly employed in flush tanks.

On removing the split eye-pin 18, the lever 17 and the bell shaped valve 9 can be removed as a unit for the purpose of enabling any repairs to be made or a new packing 12 substituted for the one previously used.

In my valve the ports 8 are normally positively sealed but as the float drops, on letting out the water from the tank, the bell valve 9 is raised, sliding on the nipple 7 and finally opening the ports 8 either partly or fully, according to the adjustment of the screw 21 which limits the opening movements of the parts by engaging the arm 4. With my valve, therefore, it is possible to regulate the opening action of the valve to suit the conditions at the tank in regard to the discharge of the water from the latter.

I claim:

1. In a valve, the combination with a coupling, of a hollow nipple attached thereto which is provided with discharge ports, an arm connected to the coupling, a lever having a detachable pivotal connection to the arm and provided with a set screw adapted to engage the arm when the lever is moved, and a valve pivoted to the lever and telescoping over the nipple, said valve being provided with packing bearing on the nipple and arranged and adapted to cover and uncover the ports of the nipple, the extent of the uncovering of the ports by the valve being regulated by the engagement of the set screw with the arm.

2. The herein described valve comprising a coupling having an arm, a hollow nipple attached to the coupling and provided with ports, a valve telescoped over the nipple and provided with a seat, packing in said seat engaging said nipple, a removable plate or head secured to the valve which retains the packing in its seat, said head being provided with an outwardly flared discharge mouth surrounding the nipple, which, by its exposure of the ports when the valve is moved, enables discharge to be effected from said ports, a lever having a detachable pivotal connection to the arm and pivoted to said valve, said lever being provided with a screw threaded extension and having ears for the attachment of the stem of a float, and an adjustable screw engaged with the threads of said extension and positioned to engage the arm to regulate the opening movement of said valve.

In testimony whereof I affix my signature.

JAMES ROBERT SMITH.